A. H. SPITZIG.
TEA AND COFFEE POT.
APPLICATION FILED DEC. 23, 1910.
1,006,886.
Patented Oct. 24, 1911.
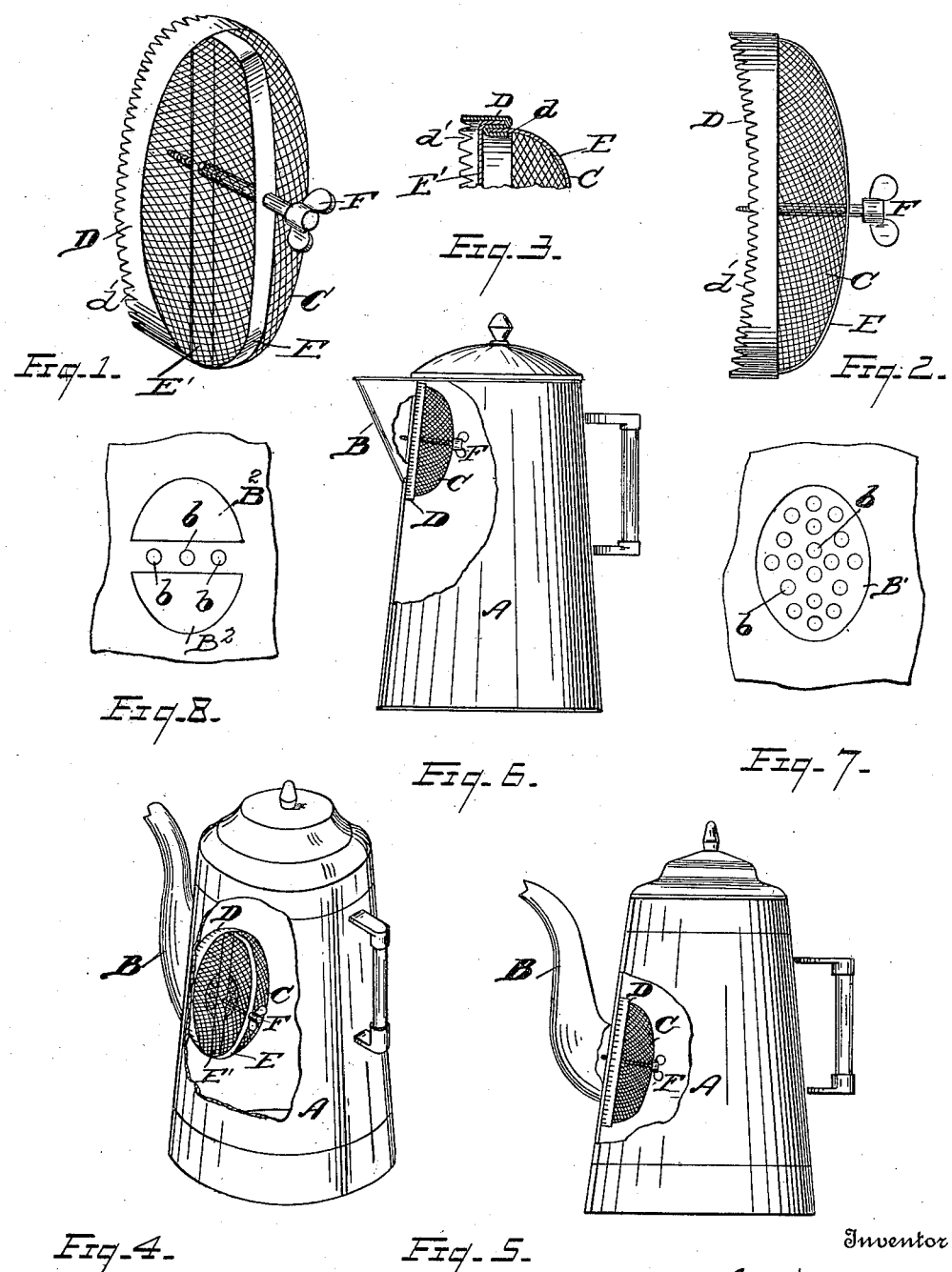
Witnesses
Chas. W. Gustavus
Grace E. Wynkoop
Inventor
Annie H. Spitzig
By S. E. Thomas
Attorney

UNITED STATES PATENT OFFICE.

ANNIE H. SPITZIG, OF DETROIT, MICHIGAN.

TEA AND COFFEE POT.

1,006,886.  Specification of Letters Patent.  Patented Oct. 24, 1911.

Application filed December 23, 1910. Serial No. 599,004.

*To all whom it may concern:*

Be it known that I, ANNIE H. SPITZIG, a citizen of the United States, residing at Detroit, county of Wayne, State of Michigan, have invented a certain new and useful Improvement in Tea and Coffee Pots, and declare the following to be a full, clear, and exact description of the same, such as will enable others skilled in the art to which it pertains to make and use the same, reference being had to the accompanying drawings, which form a part of this specification.

My invention relates to an improvement in tea or coffee pots, shown in the accompanying drawings and more particularly pointed out in the following specification and claims.

The object of my invention is to provide a strainer adapted to be supported within the tea or coffee pot and which may be readily attached to any of the usual types of pots now in common use without changing or altering their construction.

Another object is to provide a strainer of relatively large dimensions whereby the tea or coffee may flow more freely and be strained more rapidly than is possible in the usual device suspended from the spout.

Other advantages and improvements will hereafter appear.

In the drawings accompanying this specification:—Figure 1 is a perspective view of the device. Fig. 2 is a side elevation of the same. Fig. 3 is a fragmentary detail in cross-section showing the manner of engaging the wire screen in its supporting frame. Fig. 4 is a perspective view of a tea pot with the wall broken away, and the device in position. Fig. 5 is a side elevation of a tea pot with parts broken away, and the device in position. Fig. 6 is a similar view of a coffee pot. Fig. 7 is a fragmentary view of the usual perforated plate or wall of a tea pot leading to the spout;—one of the perforations of which the engaging screw of the device is designed to enter. Fig. 8 is a fragmentary view of the wall of a tea pot with the strainer plate cut away leaving a perforated cross bar bridging the opening into the spout;—the engaging screw of the device being adapted to enter one of the apertures to secure it in position.

Referring now to the letters of reference placed upon the drawings:—A is a tea or coffee pot, and B its spout.

B' is a perforated strainer plate, usually an integral part of the pot,—through which the liquor passes to the spout. The strainer plate may be cut away at the top and bottom as indicated at $B^2$ in Fig. 8, leaving a perforated cross band to receive the engaging thumb-screw,—the object of cutting the plate away is to provide for a more rapid delivery through the spout.

C is a strainer preferably bowl-shaped and of elliptical form, constructed of a closely meshed wire screen set in an encircling band D of sheet metal. The band D is provided with a return bend $d$ spaced apart to receive the fabric;—the edge bearing against the wall of the tea or coffee pot being toothed or serrated as indicated at $d'$ that it may be more elastic to readily conform to the shape of the pot.

E and E' are cross bars bridging the annular frame D perforated for the passage of the thumb-screw F,—the tapering end of the latter being adapted to enter one of the perforations $b$ of the strainer plate B', whereby the strainer is supported in position. The strainer is preferably made relatively large in order that the tea or coffee may be rapidly strained and also to admit of its having a slight lateral adjustment in order that the thumb-screw may be engaged with any of the perforations in the strainer plate B', as the apertures in the plate become worn through use.

It will be seen that with this form of strainer, there is no opportunity for the tea or coffee to drip, or if carelessly poured to fill the strainer and overflow its walls due to clogging of the screen,—the large area provided insures a free flow of the liquor through the strainer while the tea leaves or coffee grounds arrested will drop back into the pot;—the strainer being completely hidden from view.

To remove the device for cleaning, the thumb-screw is released and the strainer taken from the pot; when again installed the thumb-screw may enter the same aperture as before or any of the several perforations, should one become worn.

Having thus described my invention, what I claim is:—

1. In a removable strainer for tea or coffee pots, an annular frame having a serrated edge, a bowl-shaped strainer supported in said frame, cross-bars bridging the frame perforated for the passage of a thumb-screw, and the thumb-screw supported in the cross-bars adapted to engage the wall of the tea or coffee pot.

2. In a strainer for tea or coffee pots, an annular frame serrated on one edge, the other edge having a return bend spaced apart to receive a wire fabric, a bowl-shaped strainer formed of wire fabric, its edges supported in said frame, cross-bars bridging the frame perforated for the passage of a thumb-screw, and the thumb-screw adapted to support said strainer within the pot.

In testimony whereof, I sign this specification in the presence of two witnesses.

ANNIE H. SPITZIG.

Witnesses:
GRACE E. WYNKOOP,
SAMUEL E. THOMAS.

Copies of this patent may be obtained for five cents each, by addressing the "Commissioner of Patents, Washington, D. C."